United States Patent Office 3,423,382
Patented Jan. 21, 1969

3,423,382
POLYMERS CONTAINING CARBOXYLIC
GROUPS AND THEIR PREPARATION
Sheldon Chibnik, Plainfield, N.J., assignor to Mobil Oil
Corporation, a corporation of New York
No Drawing. Filed Dec. 15, 1964, Ser. No. 418,557
U.S. Cl. 260—93.5        16 Claims
Int. Cl. C08f 27/22, 7/04

The present invention relates to polymers containing carboxylic groups attached to aromatic constituents of the polymers, and to a process for their preparation. More specifically, this invention relates to normally solid polymers containing carboxylic groups attached to benzene rings, and to a process for preparing such normally solid polymers by introducing carboxylic groups onto benzene rings present in a polymer.

Heretofore, polymers containing carboxylic groups attached to benzene rings have been prepared by polymerization of monomers containing benzene rings having carboxylic substituents, e.g. benzene carboxylic acids such as vinyl benzoic acid.

It is an object of the present invention to provide a process whereby normally solid polymers containing benzene rings having carboxylic substituents can be prepared by introducing carboxylic groups onto benzene rings previously combined in a polymeric structure. It is another object of this invention to provide a novel class of normally solid polymers containing benzene rings having carboxylic substituents.

It has been discovered that these objectives can be accomplished by a process comprising reacting oxygen, as in a free-oxygen containing gas, with a polymeric material containing benzene rings having at least one alkyl ring substituent, in a solvent containing a lower, e.g. 2–4 carbon atom-containing, fatty acid and in the presence of a catalytic amount of a heavy metal oxidation catalyst.

The novel process is applicable to polymeric starting materials which contain at least one benzene ring having one or more alkyl substituents. Generally, an alkyl-substituted benzene ring is linked in such a polymeric structure by chemical bonds between a carbon atom directly attached to the benzene ring (other than carbon atoms in the alkyl substituents of the ring) and the adjacent monomeric units of the polymeric structure. Preferably, the carbon atoms by which the alkyl-substituted benzene rings are linked to the adjacent units of the polymeric structure are devoid of directly attached hydrogen atoms which, if present, might render that carbon atom susceptible to oxidation with possible resulting degradation of the polymer chain.

Thus, in such a preferred embodiment of the process of this invention, the polymeric starting material contains a repeating monomeric unit having the following structure:

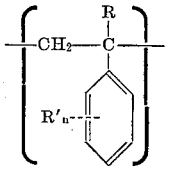

in which R and R' are alkyl and n is an integer of 1 to 3. Such polymeric starting materials are usually referred to as polymers of addition or as association polymers, i.e., polymers formed by simple addition of molecules, e.g. by rearrangement of bonds. In this specification and the appended claims, the term "polymers" should be understood as being embracive of both homopolymers and copolymers.

It has been also discovered that oxidation of the aforedescribed polymeric starting materials, in accordance with the process of this invention, is productive of a class of polymers which are believed to be novel and which contain a repeating monomeric unit having the following structure:

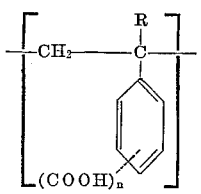

in which R is alkyl and in which n is an integer of 1 to 3.

The novel polymers of the foregoing description are useful as cross-linking agents for epoxy resins or other condensation resins, or they can be partially or completely neutralized to form organic or inorganic salts, typical of which are those prepared with alkaline earth metals and which are useful as thickening, suspending or emulsifying agents for various uses, e.g. in oil well drilling muds or in paints. The carboxylic groups in the novel polymers also act as polar sites, rendering the polymers useful as dye receptive, adhesive or anti-static materials, either alone or in a copolymer or mixture with other polymers, and as grafting sites for further modification to still other new polymers with other useful properties.

In one embodiment of the process of this invention, the polymeric starting material is a product obtained by polymerizing a polymerizable composition containing a styrene monomer having an alkyl group in the alpha position and at least one alkyl substituent on the styrene ring. Such polymeric starting materials include homopolymers of alpha-alkyl styrenes having alkyl-substituted rings, which polymers can be produced by any suitable method, e.g. the method described in U.S. Patent No. 2,490,372. More specifically, such polymeric starting materials include homopolymers of alpha-methyl, alpha-ethyl, or other alpha-alkyl styrenes having rings bearing one or more methyl, ethyl, or other alkyl groups in any of ring positions 2 through 6. Specific examples include homopolymers of α,p-dimethylstyrene, α,m-dimethylstyrene, α,o-dimethylstyrene, α,3,5-trimethylstyrene, α,2,5-trimethylstyrene, α,2,4,-trimethylstyrene, α,3,4-trimethylstyrene, α,2,3-trimethylstyrene, α,2,6,trimethylstyrene, or of any α-tetramethylstyrene having three methyl ring substituents. Other specific examples include homopolymers of similarly substituted styrene units having an ethyl, propyl or other alkyl group in place of the alpha-methyl groups and/or one or more of the methyl ring substituents.

The process of this invention is also applicable to copolymers of any of the aforementioned alpha-alkyl styrenes having alkyl-substituted rings with one or more other polymerizable monomers such as, for example, other (preferably alpha-alkyl) styrenes having alkyl-substituted rings, olefins, acrylates, acrylonitriles, etc. Such copolymers can similarly be produced by any suitable method and also preferably contain units having a structure of the type illustrated hereinbefore as representative of polymeric starting materials useful in the process of this invention. Specific examples of copolymers to which the novel process is applicable include copolymers of any of the aforementioned alpha-alkyl styrenes having one to three alkyl ring substituents with any other of such alpha-alkyl styrenes having alkyl-substituted rings, or with ethylene, propylene, butene-1, butadiene, methacrylate, methyl methacrylate, ethyl methacrylate, ethyl acrylate, methyl ethyl acrylate, acrylonitrile, methyl acrylonitrile, ethyl acrylonitrile, maleic anhydride or with mixtures of any of the foregoing polymerizable monomers.

In the oxidation of any of the aforedescribed types of polymeric starting materials in accordance with the process of this invention, the positions in which the alkyl groups are attached to the benzene rings may affect the percentage of conversion of such alkyl groups to carboxylic groups, depending on whether a suitable oxidation promoter is included in the reaction mixture. In the absence of such a promoter, thorough oxidation of the polymeric starting material will be more easily accomplished if the alkyl substituents are in meta or para positions on the benzene rings, since ortho-alkyl substituents are relatively hindered against reaction according to the process of this invention. When there are two or more alkyl substituents on some or all of the benzene rings in the polymeric starting material, and in the absence of such a promoter, a greater proportion of dicarboxylic units will result if the substituents are in non-adjacent positions, since a ring having adjacent substituents, e.g. a 3,4-dimethyl substituted ring, would generally be oxidized at only one of the two adjacent positions. The positions most favorable for oxidation of polymeric dialkyl-substituted rings to dicarboxylic units without an oxidation promoter are therefore the 3 and 5 ring positions, in which the alkyl groups are not hindered by adjacent ring substituents or by being in an ortho position. On the other hand, the use of a starting material containing 2,4- or 2,5-dialkyl-substituted rings will result, when no oxidation promoter is employed, in a polymeric product containing both monobasic and dibasic benzene carboxylic units.

Alternatively, the hinderance effect on ortho or adjacent alkyl substituents can be overcome, and oxidation of all alkyl substituents on the rings insured regardless of their positions, by including in the reaction mixture a suitable oxidation promoter, e.g. bromine in elemental, combined or ionic form, as described in U.S. Patent No. 2,833,816.

When the alkyl ring substituents which are oxidized according to the process of this invention are methyl groups, the resulting oxidized substituents on the rings will be predominantly carboxylic groups, i.e., —COOH groups. However, when alkyl groups higher than methyl are the initial ring substituents, other oxidized groups, in addition to carboxylic groups, may result. For example, when ethyl ring substituents are oxidized by the novel process, some of the ethyl groups will be converted to carboxylic (—COOH) groups, while others will be oxidized to methyl carbonyl (—COCH$_3$) groups.

In carrying out the process of this invention, the polymeric material is dissolved in a solvent medium containing a lower fatty acid, and then oxidized in the presence of a heavy metal oxidation catalyst.

Acetic acid is a preferred acid for use in the solvent medium, but a mixture of lower fatty acids, i.e., acetic, propionic, and/or butyric acids, can be used. Alternatively, the solvent medium can contain a mixture of one or more of such lower fatty acids and benzene. Suitable percentages of acid and benzene in such an alternative solvent medium are generally between 30% and 75% by volume of lower fatty acid and between 25% and 70% by volume of benzene. Percentages of benzene below 25% can be used satisfactorily; however, the solubility of the heavy metal oxidation catalyst is generally greatly reduced and the reaction considerably retarded if the percentage of benzene is higher than 70%.

In an embodiment, the polymeric starting material containing alkyl ring substituents to be oxidized is used in an amount between about 2% and about 20%, most advantageously about 10%, by weight of the solvent medium, and with initial presence in the reaction mixture of an amount of water between about 1% and about 10% by weight of the solvent medium.

The heavy metal oxidation catalyst can be any of the group of heavy metals shown in the "Periodic Chart of the Elements" appearing on pages 56 and 57 of the "Handbook of Chemistry," 8th edition, published by Handbook Publishers, Inc., Sandusky, Ohio, 1952. Of the heavy metal group, those metals having an atomic number not greater than 84 are generally suitable. Particularly good results are obtainable with a metal of the group consisting of cobalt, manganese, nickel, chromium, vanadium, molybdenum, tungsten, tin and cerium, and best results are obtained by utilization of a metal having an atomic number in the range of from 23 to 28, inclusive. The catalytic amount of the heavy metal oxidation catalyst can be present either as a single metal or as a combination of two or more of such metals. The metal may be added to the reaction mixture in elemental, ionic or combined form, e.g. as a salt of the metal. In one preferred embodiment, the oxidation catalyst is present in the solvent medium as a soluble cobalt lower alkanoate salt corresponding to the fatty acid in the solvent medium, e.g. cobalt acetate, propionate, butyrate or mixtures thereof, and in a catalytic amount, generally between about 0.1% and about 1% by weight of cobalt metal based on the weight of the solvent medium.

There can also be included a suitable reaction activator such as 2-butanol or a methylenic ketone, e.g. methyl ethyl ketone, methyl n-propyl ketone, diethyl ketone, 2,4-pentanedione or 2,5-hexanedione, with methyl ethyl ketone being the preferred ketone activator. When used, its inclusion in an amount of at least about 1%, preferably between about 3% and about 7%, by weight of the solvent medium, is favored for purposes of increasing the percentage in which available alkyl ring substituents are converted to carboxylic groups by the process of this invention.

The oxidation is effected by contacting the reaction mixture with a gas containing molecular oxygen, preferably at a partial pressure of oxygen between about 100 and about 1000 pounds per square inch, and most advantageously between 100 and 500 pounds per square inch. Thus air, air enriched with oxygen, or gaseous oxygen of commercial purity may be used.

Although higher or lower temperatures can be employed, suitable results are obtained with reaction temperatures between about 120° C. and about 145° C., and particularly good results are obtained with a reaction temperature of about 130° C.

If the oxidation is carried out at atmospheric pressure, the reaction time should be between about 16 and about 24 hours. However, by using the conditions within the numerical ranges described above, the desired oxidation occurs rapidly, generally within a few minutes, with a high degree of conversion of the alkyl substituents on the benzene rings to the corresponding carboxylic acid groups. The oxidation is generally allowed to proceed at gas pressures of between 100 and 500 pounds per square inch for only a few minutes and at most for not longer than about an hour or two, with the reaction preferably terminated before all of the readily reactive alkyl groups have been oxidized to carboxylic groups. The reaction time is generally limited to the period required for a predetermined percentage conversion of the alkyl ring substituents in the polymeric starting material to carboxylic groups. Generally, such a predetermined conversion is limited to not more than 95% of the alkyl ring substituents in the polymeric starting material. By such control, the alcohol or ketone activator, if employed in the reaction mixture, can be preserved in substantial proportion for subsequent reuse.

The ratio between the carboxylic groups produced on the polymeric material and the alkyl substituents remaining unoxidized thereon can be controlled by appropriate regulation of process operating conditions, e.g. by variation of the reaction time, temperature and/or pressure. The percentage conversion of alkyl ring substituents to carboxylic groups may also be increased by adding to the reaction mixture at about the half way point in the oxidation reaction (the point at which the proportion of oxidized alkyl groups is approximately half of that desired), about one mole of lower fatty acid anhydride per mole of water produced by the oxidation reaction up to the half way point.

The following examples ilustrate the process of this invention. However, it will be appreciated by those skilled in the art that this invention is not limited to the specific polymeric starting material, solvent medium or catalyst used in the examples, nor to the specific process conditions used therein.

EXAMPLE I

A 300 milliliter stirred autoclave was charged with 2.5 grams of cobalt (II) acetate tetrahydrate, 5 grams of methyl ethyl ketone, 30 milliliters of glacial acetic acid and a solution of 6.7 grams of poly (α,p-dimethylstyrene) in 70 milliliters of benzene. As added to the reaction mixture, the polymer had a molecular weight of 1500 as measured by vapor phase osmometry. The autoclave was sealed and heated to 130° C. under an oxygen pressure of 250 p.s.i. The temperature was held between 125 and 135° C. by heating or cooling as necessary and the pressure was maintained by fresh additions of oxygen. Oxygen absorption was complete after two hours. After cooling and venting the autoclave, the reaction mixture was treated with water to precipitate the product. The oxidized polymer was digested with dilute hydrochloric acid to remove residual cobalt, after which it was found to have a molecular weight of 1870, indicating no substantial degradation of the polymer chain, and a neutralization equivalent of 219, showing that approximately 75% of the aryl methyl groups had been converted to carboxylic groups. The product polymer melted above 295° C.

EXAMPLE II

Example I was repeated using a poly (α,p-dimethylstyrene) having a molecular weight of 2600. The oxidized polymer, which precipitated during the course of the reaction, was purified by digestion with hydrochloric acid. The product polymer had a molecular weight of 2400 and a neutralization equivalent of 208, indicating that about 75% of the aryl methyl groups had been oxidized to carboxylic groups.

It will be appreciated by those skilled in the art that although in the foregoing description, the process of this invention has been described in only illustrative embodiments in some aspects, other polymeric starting materials, other solvent media, other catalysts and activators, and other process conditions can be employed within the spirit and scope of the present invention. Accordingly, such variations and modifications of the process of this invention are considered to be within the purview and scope of the appended claims.

I claim:

1. A process for preparing a normally solid polymer containing, as a repeating monomeric unit, a benzene ring having one to three carboxylic substituents, which process comprises providing a solution of a polymeric material containing a repeating monomeric unit having the following structure:

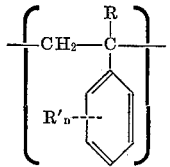

in which R and R' are alkyl and $n$ is an integer of one to three, in a solvent medium containing 30–100% by volume of a lower fatty acid having two to four carbon atoms and 0–70% by volume of benzene, said solution containing a catalytic amount of a heavy metal oxidation catalyst selected from the group consisting of cobalt, manganese, nickel, chromium, vanadium, molybdenum, tungsten, tin and cerium, and contacting the solution with a free oxygen-containing gas at a temperature between about 120° C. and about 145° C.

2. A process, as defined in claim 1, in which R is methyl.

3. A process, as defined in claim 1, in which R' is methyl.

4. A process, as defined in claim 1, in which R and R' are methyl, $n$ is 1, and R' is attached to the para position of the benzene ring.

5. A process, as defined in claim 1, in which the polymeric material is initially present in the solution in an amount between about 2 and about 20% by weight of the solvent medium.

6. A process, as defined in claim 1, in which the lower fatty acid is acetic acid.

7. A process, as defined in claim 1, in which the solvent medium contains 30–75% by volume of a 2–4 carbon atom-containing fatty acid and 25–70% by volume of benzene.

8. A process, as defined in claim 7, in which the fatty acid is acetic acid.

9. A process, as defined in claim 1, in which the heavy metal oxidation catalyst comprises a heavy metal having an atomic number of from 23 to 28.

10. A process, as defined in claim 9, in which the heavy metal oxidation catalyst is a soluble cobalt salt.

11. A process, as defined in claim 1, in which the solvent medium contains a reaction activator.

12. A process, as defined in claim 11, in which the reaction activator is methyl ethyl ketone.

13. A process, as defined in claim 1, in which the solvent medium initially contains an amount of water between about 1% and about 10% by weight of the solvent medium.

14. A process, as defined in claim 1, in which the reaction is carried out at a pressure between about 100 and about 500 pounds per square inch.

15. A normally solid polymer having a molecular weight of the order of from 1870 to 2400 and containing a repeating monomeric unit having the following structure:

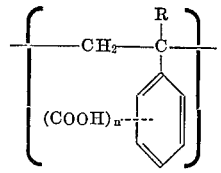

in which R is an alkyl radical of the group consisting of methyl, ethyl and propyl radicals, $n$ is 1 or 2 and carboxyl groups are attached only to nonadjacent carbon atoms in the 3, 4 and 5 positions in the styrene ring.

16. A normally solid polymer, as defined in claim 1, in which R is methyl, $n$ is 1, and the —COOH group is attached to the carbon atom in the 4 position of the styrene ring.

References Cited

UNITED STATES PATENTS

| | | | |
|---|---|---|---|
| 2,561,814 | 7/1951 | Novotny et al. | 260—93.5 |
| 3,036,122 | 5/1962 | Ardis et al. | 260—524 |
| 3,102,135 | 8/1963 | Petropoulos et al. | 260—524 |
| 3,155,717 | 11/1964 | Brown et al. | 260—524 |
| 3,177,244 | 4/1965 | Schmerling et al. | 260—515 |
| 3,214,416 | 10/1965 | Waack | 260—93.5 |
| 3,161,693 | 12/1964 | Serres et al. | 260—524 |

(Other references on following page)

FOREIGN PATENTS 581,952   8/1959   Canada.

OTHER REFERENCES

Chemical Abstract, vol. 55, pp. 3504—260–524.

Toland: Industrial and Eng. Chem.—Unit Process Review, vol. 52, No. 10, October 1960, pages 873–878—260–524.

Letsinger et al.: Journal of the American Chemical Society, vol. 81, April-June 1959, pages 3009–3012.

JOSEPH L. SCHOFER, *Primary Examiner.*

J. C. HAIGHT, *Assistant Examiner.*

U.S. Cl. X.R.

260—78.4, 78.5, 80.6, 80.7, 80.78, 80.81, 84.1, 85.5, 86.7, 88.2.

UNITED STATES PATENT OFFICE
CERTIFICATE OF CORRECTION

Patent No. 3,423,382 January 21, 1969

Sheldon Chibnik

It is certified that error appears in the above identified patent and that said Letters Patent are hereby corrected as shown below:

Column 6, line 59, claim reference numeral "1" should read -- 15 --.

Signed and sealed this 24th day of March 1970.

(SEAL)
Attest:

Edward M. Fletcher, Jr.  
Attesting Officer

WILLIAM E. SCHUYLER, JR.  
Commissioner of Patents